United States Patent [19]
Von Allmen et al.

[11] 4,114,018
[45] Sep. 12, 1978

[54] METHOD FOR ABLATING METAL WORKPIECES WITH LASER RADIATION

[75] Inventors: Martin Von Allmen, Ortschwaben; Hans Peter Schwob, Uetendorf, both of Switzerland

[73] Assignee: Lasag AG, Thun, Switzerland

[21] Appl. No.: 728,403

[22] Filed: Sep. 30, 1976

[51] Int. Cl.² ............................................. B23K 27/00
[52] U.S. Cl. .......................... 219/121 LM; 73/432 L; 96/38.4; 346/76 L
[58] Field of Search .................... 219/121 LM, 121 L; 73/432 L; 96/36, 37, 38.4; 346/76 L; 156/17

[56] References Cited
U.S. PATENT DOCUMENTS

| | | | |
|---|---|---|---|
| 3,601,576 | 8/1971 | Schlafli | 219/121 LM |
| 3,824,368 | 7/1974 | Locke | 219/121 LM |
| 3,843,401 | 10/1974 | Carroll | 73/432 L |
| 3,860,784 | 1/1975 | Brown et al. | 219/121 LM |
| 3,962,558 | 6/1976 | Kocher | 219/121 LM |
| 4,000,392 | 12/1976 | Baras | 219/121 LM |

OTHER PUBLICATIONS

"Laser Applications Material Processing " 3/1971.

*Primary Examiner*—J. V. Truhe
*Assistant Examiner*—M. Paschall
*Attorney, Agent, or Firm*—Wegner, Stellman, McCord, Wiles & Wood

[57] ABSTRACT

A technique for ablating a metal workpiece by the use of laser beam radiation at an efficiency higher than heretofore possible and an improved regulation of the ablation process. Undesired side effects of the ablation process are eliminated by the entire and complete ejection of the molten metal at the point of beam impingement so that no material remains on the workpiece in the areas between contiguous points of ablation. The appropriate selection of beam intensity and the selection of pulse shape provide the inventive technique.

18 Claims, 16 Drawing Figures

FIG. 11
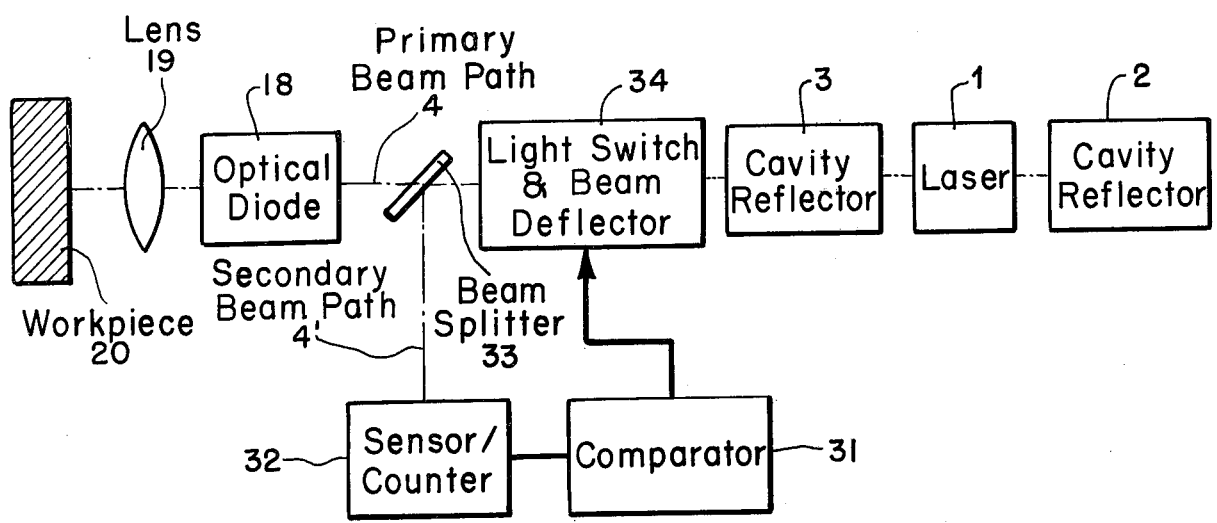
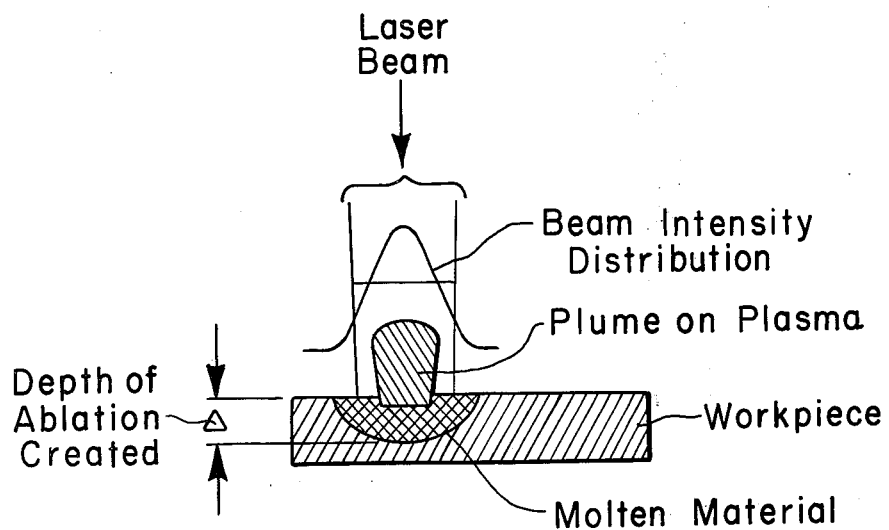
FIG. 5b

METHOD FOR ABLATING METAL WORKPIECES WITH LASER RADIATION

BACKGROUND OF THE INVENTION

This invention relates to a method for selectively ablating material from a workpiece by the use of laser beam radiation and more particularly to ablating metal workpieces by a pulse or pulses of laser beam radiation in which the cross-sectional intensity of the beam is temporally and spatially controlled.

The selective removal of the material by laser radiation is well known. However, these techniques are not efficient and the processes cannot be controlled with sufficient precision. Processes known to the prior art characteristically provide undesirable side effects. Such side effects involved smeared surfaces, cracks and the appearance of sputtered material on the surface of the workpiece around the ablated area, which material results from the noncomplete ejection of the metal during the ablation process.

Many prior art systems employ pulsed laser radiation for the ablation of material. Some laser systems produce a sequence of pulses having an irregular intensity distribution to cause the ablation. Cross-sectional intensity of the beam has not been temporally controlled by these systems.

Another method of ablation includes the use of laser pulses having varying lengths and intensities. For example, Swiss patent CH-PS No. 547,690 describes a system for generating a beam having a symmetrically uniform transverse spatial configuration. The beam is generated by an oscillator which provides single mode operation. The intensity distribution of the beam is of a Gaussian shape. However, such systems are generally unsatisfactory because the apparatus employed to carry out the processes are incapable of accurately reproducing the pattern.

Since most metal workpieces reflect a significant portion of the energy of the beam, undesirably high-powered systems are required to cause ablation. These high-powered systems are expensive and inefficient. However, German patent DOS No. 24 30 994 teaches that as the beam intensity increases, and as the heated surface interacts with the beam, the absorption level increases greatly and if the intensity of the beam is appropriately adjusted, the process can be efficient. However, this system and its process appear to be difficult to control because of the rapid changes in the absorption level at the workpiece.

Another proposed solution to the problem of ablation control is found in Swiss patent CH-PS No. 532,993 or U.S. Pat. No. 3,962,558. There the ablation of the material is effected incrementally by the application of successively applied spikes of energy from a pulsed laser. The first spike, which is of high intensity, appears to increase the absorption level of the workpiece and the smaller subsequently applied spikes provide a controlled vaporization of the metal workpiece. By determining the number of pulses applied to the workpiece, the depth of the ablation can be controlled. This process causes ablation through the successive vaporization of molten metal by each pulse without creating sufficient vapor pressure to overcome the surface tension of the molten liquid. Thus, no material is ejected in the area of impingement. The efficiency of the process, however, is limited because of the high amount of energy required to maintain the successive vaporization. If the intensity of the individual spikes provided to the workpiece is increased, the vapor pressure becomes sufficient to cause the ejection of the molten material. However, a significant amount of energy is lost in the ejected molten material at the area of impingement and, accordingly, each subsequently applied pulse must reheat and vaporize the material before it will again be ejected.

Theories for explaining the ablation process are not precisely established. However, it is generally believed that for beams having an intensity of less than $10^7$ W/cm$^2$ at the surface of the workpiece, the ablating process seems to be limited by heat conduction losses. Hence, the heating and vaporization characteristics of the material are different for each type of material (e.g., steel, copper) ablated. However, as beam intensity increases, beginning with approximately $10^9$ W/cm$^2$, a plasma forms in the area exposed to the beam at the workpiece surface and the efficiency is reduced because the increased energy is absorbed by the plume or the plasma rather than by the metal workpiece itself. This condition is not considered to be desirable. Theories were also suggested which would attempt to predict the temperatures required to vaporize the material at the area of impingement, which temperatures were higher than the evaporation temperature of the material. Such temperatures tend to cause localized explosions in the workpiece at the area of impingement. Also, it has been determined that at particular beam intensities, portions of the ablated material in the area of impingement are not vaporized, but rather are ejected in molten fluid form. Areas between contiguous points of ablation on the workpiece were found to have deposited thereon material which had been ejected from the ablation. This, too, is an undesirable condition.

The present invention, therefore, provides a technique for ablating a metal workpiece with a laser beam operating at levels of efficiency higher than heretofore possible and an improved regulation of the ablation process. Moreover, the invention attempts to reduce the undesired side effects of the ablation process by eliminating the ejected material appearing in the areas between the contiguous points of ablation. The invention is the result of the discovery that the ablation process can be enhanced by the appropriate selection of beam intensity and by the appropriate selection of pulse shape.

SUMMARY OF THE INVENTION

The present invention employs the technique of providing the single or multimode beam at an intensity slightly greater than the intensity required to create a constant local vaporization of the workpiece, whereupon the vapor pressure is high enough that the molten metal is entirely and completely ejected from the surrounding area of beam impingement. The process is aided by the control of the trailing edge of the laser pulse. This causes a clean ablation in and around the area of impingement. The total beam energy is sufficient to keep the quantity of metal molten while it is expelled. The trailing edge of the laser pulse is sufficiently short so that the molten metal not ejected does not receive an amount of energy capable of only sputtering the material out upon the surrounding areas of the workpiece. This means that at the start of the ablating process, the intensity of the beam is sufficient to break down the surface reflectivity. Then the beam intensity is controlled so as to cause melting of the metal at the point of impingement and then to cause constant vaporization and ejection of the molten material. The energy in the beam is kept sufficient to melt the material in the area of impingement and to replace the energy which is lost by the metal that is ejected out of the hole as gross vaporization occurs. The kinetic energy of the ejected molten material is so great that no metal deposits arise on the processing margins or between contiguous points of ablation. The intensity of the beam is terminated rapidly to assure that no metal deposits arise on the processing margins or between contiguous points of ablation.

This method is accomplished by a system which employs a discharge circuit connected to a pumped laser to produce essentially rectangular pulses. The transverse spatial configuration of the laser beam is obtained by the use of known means (e.g. a diaphragm). The cavity of the laser system is constructed in such a fashion that the transient portion of the pulse is of short duration and during the primary pumping period the energy of the light emitted by the laser is essentially constant. Preferably, the intensity of the laser beam in the area of impingement is held essentially constant during the entire ablating process irrespective of the desired depth of the ablation. A light switch disposed in the laser path is used to assure the delivery of the desired pulse shape to the workpiece.

BRIEF DESCRIPTION OF THE DRAWINGS

FIG. 5(b) represents a model of the physical effects caused by a laser beam at the point of impingement on a metal workpiece;

FIG. 11 is yet another system used for the practicing of the present invention;

DESCRIPTION OF THE PREFERRED EMBODIMENT

Figure 1:
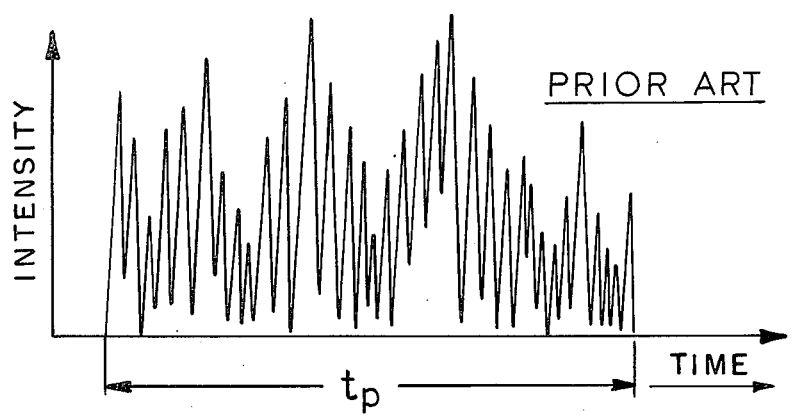
FIGS. 1-3 depict various pulse shapes, known to the prior art, which have been employed to ablate a workpiece.
Figure 2:
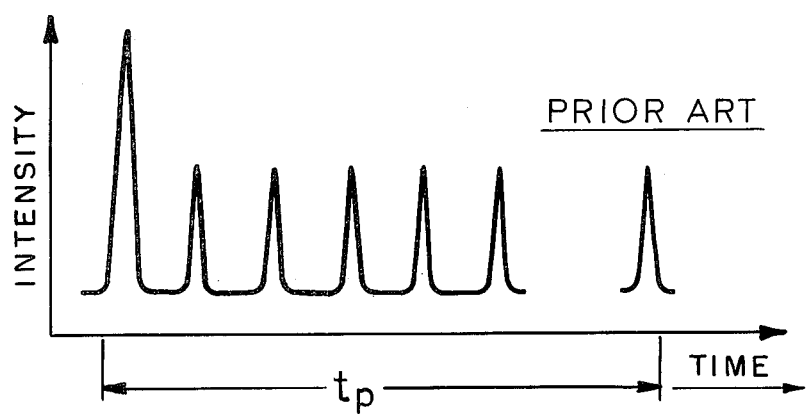
Figure 3:
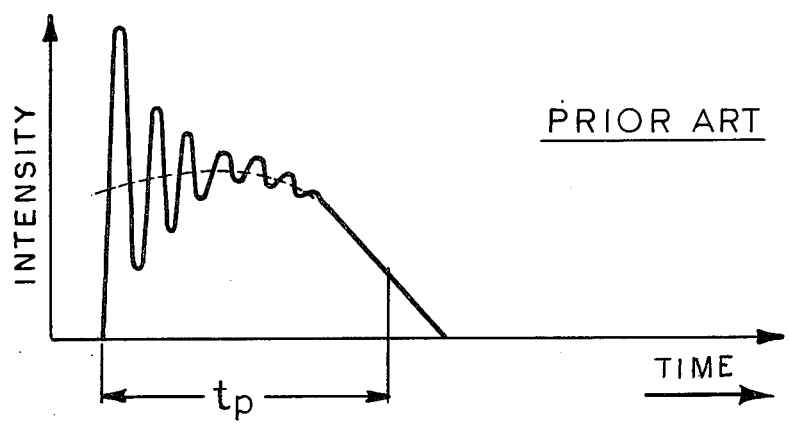

FIGS. 1-3 show various pulse shapes known to the prior art for the ablation of a workpiece. The beam of laser radiation is delivered to the workpiece for the period $t_p$. For example, see U.S. Pat. No. 3,962,558.

Figure 4:
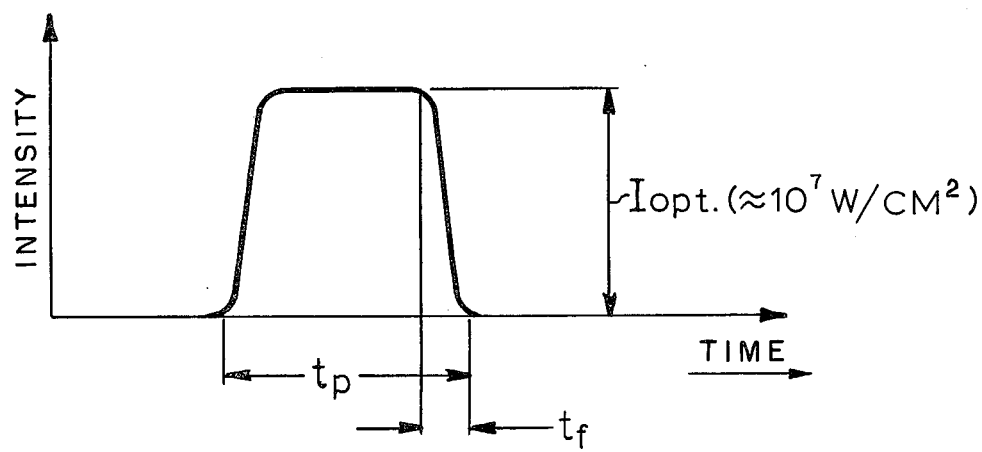
FIG. 4 is a laser pulse developed in accordance with the present invention for the ablation of a workpiece.

FIG. 4 depicts the desired pulse shape of the laser intensity used to ablate a workpiece in accordance with the present invention. The abrupt leading edge of the pulse is sufficient to break down the surface reflectivity and essentially all of the energy is absorbed (i.e., not reflected) by the workpiece. The sharp decrease in energy during the period $t_f$ is selected such that the molten material is ejected from the area of impingement to leave a clean hole at the point of ablation. To achieve a clean hole at the point of ablation, $t_f$ must be kept equal to or less than approximately 0.1 microseconds. Although the optimally precise intensity varies depending upon the type of material employed as the workpiece, the approximate value of the intensity for the pulse $t_p$ delivered to the workpiece as shown in FIG. 4 is $10^7$ W/cm$^2$. For example, the intensity required to ablate aluminum according to the invention is approximately $0.5-1.0 \times 10^7$ W/cm$^2$. Pure copper requires an intensity of $0.7-1.2 \times 10^7$ W/cm$^2$. The pulse length of laser radiation delivered to the workpiece, $t_p$ in the case of FIG. 4, is typically 5 $\mu$sec. These intensities and the corresponding pulse length are sufficient for shallow ablation, that is, when the depth of the hole or ablation created is less than its diameter.

If the ablation of the workpiece is to be effected to a greater depth, that is, when the depth of the hole created is greater than its diameter, then the intensity of the laser radiation delivered to the workpiece must be increased in order to produce the energy necessary for the complete ejection of the molten material. Beam intensity for deep ablation can be calculated.

From the differential equation which describes temperature generated by a plane heat source, moving at a velocity of v, (i.e. the drilling velocity) wherein phase transitions from solid to molten metal are disregarded, the interval $\Delta$ between the isotherm $T_o$ (surface temperature) and $T_s$ (temperature at which the metal melts) is $$\Delta = (\chi/v) \ln (T_o/T_s) \qquad \text{Equation (1)}$$

where $\chi$ is temperature conductivity.

The above equation represents the thickness of the ablation caused by the metal ejected.

Assuming a pressure $p$ is exerted on the workpiece at the point of impingement with a surface area $r^2\pi$ and also assuming that the velocity with which the liquid is laterally ejected from the volume $2\Delta\pi r$ is $$v_r = \sqrt{2p/\rho} \qquad \text{Equation (2)}$$

where $\rho$ is the density of the molten metal, then according the principle of continuity, $$r^2\pi\, v = \sqrt{2p/\rho}\, 2r\pi\Delta. \qquad \text{Equation (3)}$$

Thus, from equations (1) and (3)

$$v^2 = \frac{2\chi}{r} \ln \frac{T_o}{T_s} \sqrt{\frac{2p}{\rho}} \qquad \text{Equation (4)}$$

Also, the pressure required to overcome the surface tension $\sigma$ of the molten material can be represented as:

$$p = 2\sigma/r \qquad \text{Equation (5)}$$

Referring to FIG. 5(b), the radial beam intensity distribution is shown which results from the laser beam. Also shown is the plume or plasma generated by the laser and the molten material extending for a depth of Δ.

The lowermost limit for the required beam intensity $I_m$ which will replace the energy removed from the area of impingement by the ejected material is $$I_m > \rho v(C T_s + Q_s) \qquad \text{Equation (6)}$$

where $v$ = velocity at which the bottom of the hole moves
$C$ = specific heat [T/g° C.]
$T_s$ = melting temperature of the metal [° C.]
$Q_s$ = heat required to melt the metal [T/g]
$\rho$ = density of the metal The beam indensity $I_v$ in the case of pure vaporization is $$I_v = \rho v(C T_v + Q_v) \qquad \text{Equation (7)}$$

where $v$ = velocity at which the bottom of the hole moves
$C$ = specific heat
$T_v$ = temperature at which the metal vaporizes
$Q_v$ = heat required to evaporate the metal
$\rho$ = density of the metal An approximation of the temperatures can be made in such a fashion that the surface temperature ($T_o$) equals the temperature of vaporization ($T_v$) and the temperature of the molten material is represented as the mean value of the melting and vaporization temperature. Thus, in that case:

$$I_m > [Q_s + C(T_v + T_s)] \sqrt{\chi \ln \frac{T_o}{T_s}} \sqrt{\frac{\sigma \rho^3}{r^3}}$$

These approximations are not precise, and the intensity required by this invention exceeds the calculated value. More precise approximations require the use of more complex equations. This requires the aid of a computer. Examples calculated by the aid of a computer show that the minimum value of intensity obtained from the above equation is three or four times smaller than that which is obtained by the use of the computer. In practice, it generally suffices to calculate the value of intensity according to the above given equation and then to multiply that value by a factor of three or four. If more precise data are required, then the calculations provided by the equations are not sufficient either, since the known parameters which relate to the particular workpiece are not sufficiently precise. A direct conclusion regarding the selection of the appropriate intensity is obtained by experimentation. Specifically, measurements can be made of the depth of the ablation for various intensities of a selected metal workpiece.

Figure 5A:
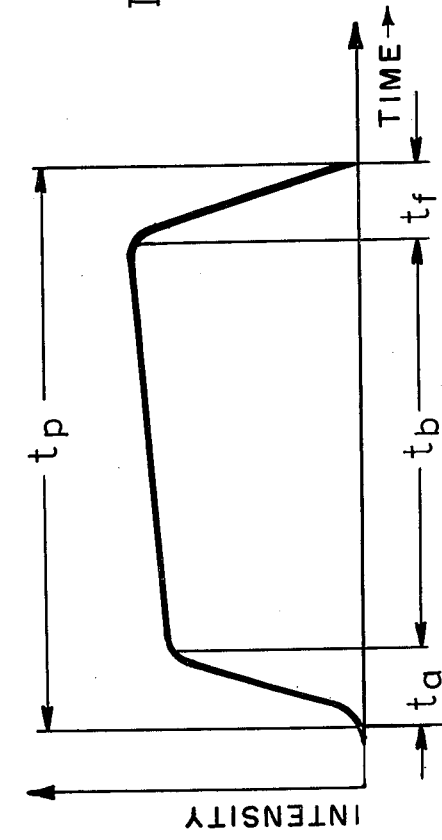
FIG. 5(a) shows the desired laser pulse shape used for creating deep ablations in accordance with the present invention.

As previously stated, FIG. 5(a) is a graph of the desired intensity of a laser pulse required to effect deep ablation in accordance with the present invention.

Referring to FIG. 5(a), it can be seen that the intensity of the pulse increases abruptly at the start of the pulse $t_o$ for the length of time indicated as $t_a$. Typically, $t_a$ equals $10^{-7}$ seconds. Then, the pulse gradually increases in intensity for the period of time $t_b$. Typically, $t_b$ starts at an intensity of approximately $1 \times 10^7$ W/cm², and increases to a level of $2 \times 10^7$ W/cm² at the end of the period $t_b$. Typically, $t_b$ has an approximate length of 10-100 μsec. The pulse time $t_f$ indicates the sharp decrease in energy required to eject the molten material from the deep hole. Typically, $t_f$ is 0.1μ second or less. The period $t_p$ indicates the length of time the pulse of laser radiation is provided to the workpiece.

Figure 6:
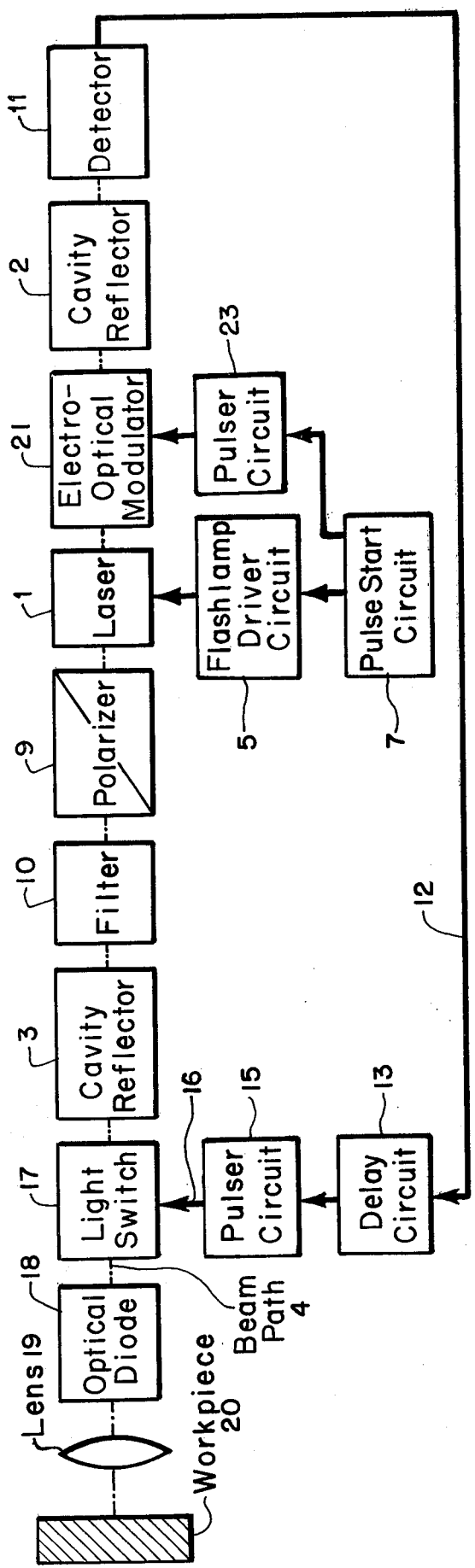
FIG. 6 is a system capable of practicing the present invention.

Referring to FIG. 6, a laser operates in conjunction with two cavity reflectors 2 and 3 to form the lasing system. The flashlamp driving circuit 5 is responsible for developing the required pulse shape of the beam intensity and is controlled by pulse start circuit 7. Single mesh-type circuits are usually employed to provide the flashlamp current of the flashlamp drive circuit 5. The design of the circuit depends upon the flashlamp type, energy input, desired pulse shape and length. The equations for the design of the circuits can be found in *IEEE Journal of Quantum Electronics*, Vol. QE-2, No. 11, November 1966, p. 707 entitled "Design of Flashlamp Driving Circuits" by Markiewicz and Emmett. The designing of flashlamp circuits to provide a pulse of a particular shape is well within the skill of the art.

Polarizer 9 and filter 10 provide the desired polarisation and intensity of the laser radiation and improve system performance in a well known manner. Light detector 11 measures the small amount of light which is permitted to pass through cavity reflector 2. The light detector 11 provides a signal to the delay circuit 13 by line 12 which is indicative of laser buildup occurring in the cavity. Light switch 17 is responsive to the information received from the delay circuit 13. Specifically, upon the reception of information from the detector 11, the delay circuit is rendered operative and controls the light switch 17 through the pulser 15. Light switch 17 is disposed in the primary beam path 4 and is capable of rendering itself opaque to laser radiation when controlled to do so. Such a switch is available as Model 1040 from Lasermetrics, Teaneck, New Jersey. Pulser circuit 15, which is a solid state nanosecond pulser using Marx bank techniques, is coupled to the light switch 17 by line 16 to provide the necessary power to render the optical switch opaque to laser radiation upon the command from the delay circuit 13. A detailed paper discussing the construction of the solid state pulser can be found in *Nuclear Instruments and Methods* 44 (1966) p. 224, in an article by Jung and Lewis entitled, "A Solid State Nanosecond Pulser Using Marx Bank Techniques". Of course, delay circuit 13 could also be directly connected to the light switch 17 if the power provided by the delay is sufficient to control the light switch 17. The purpose of the light switch 17, delay 13 and pulser 15 will be discussed below.

The beam emanates from the light switch 17 and passes through an optical diode 18 which may consist, for example, of an additional polarizer and a quarter-wave plate and is focused at the workpiece 20 by lens 19. If Q-switching techniques are to be employed in this system, electro-optical modulator 21 and its corresponding pulser circuit 23 must be provided. By using the Q-switching of an optically pumped laser, huge pulses of optical radiation can be generated. This technique involves the controlling of the beam polarization within the optical cavity. Accordingly, pulse start circuit 7 provides information to the flashlamp driver circuit 5 and pulser circuit 23 to effect the proper coordination of the laser 1 and the electro-optical modulator 21. Spontaneous laser emission from laser 1 provides evenly polarized light. This light passes through electro-optical modulator 21 and becomes unevenly polarized. The action of controlling the beam polarization by electro-optical modulator 21 prevents premature laser emission and permits the energy to be stored in the laser material through population inversion in the well known manner. When the inversion is maximized, the electro-optical modulator 21 is deenergized and the available stored energy in the system is discharged in a single, high-powered pulse. The electro-optical modulator is available from Lasermetrics of Teaneck, N.J., as Model 1040. Typically, known electro-optical modulators operating in conjunction with the pumped laser, can provide a pulse having a duration of between 5 and 50 nanoseconds with the peak power density of 100 to 500 megawatts per $cm^2$. To establish the proper conditions for Q-switching techniques, electro-optical modulator 21 must be aligned, crystographically, parallel to the polarization plane of the laser. A voltage applied to electro-optical modulator 21 is applied by pulser circuit 23, whose construction is similar to pulser 15.

It should be pointed out that the inclusion of the polarizer 9 is not essential if the laser material of the laser resonant cavity is strongly polarized. Also, electro-optical modulator 21 and/or the light switch 17 could be replaced by an output modulator. For example, an electro-optically tuned and mechanically tuned Fabry-Perot resonator (which would also provide the function of the cavity reflector(s)) could be used.

The individual elements of the system, as shown in FIG. 6, are known and it is assumed that one skilled in the art is familiar with them. However, there are characteristics of the system which should be mentioned here. Pulses of the type shown in FIGS. 2 and 3 and having a length $t_p$ can be generated by the system shown in FIG. 6. These particular pulse shapes and their respective functions are more completely described in U.S. Pat. No. 3,962,558. However, by the use of the appropriate flashlamp current as developed by the flashlamp driver circuit 5, the system shown in FIG. 6 is capable of generating a pulse having the characteristics of line 25 in the graph of intensity versus time in FIG. 7.

Figure 7:
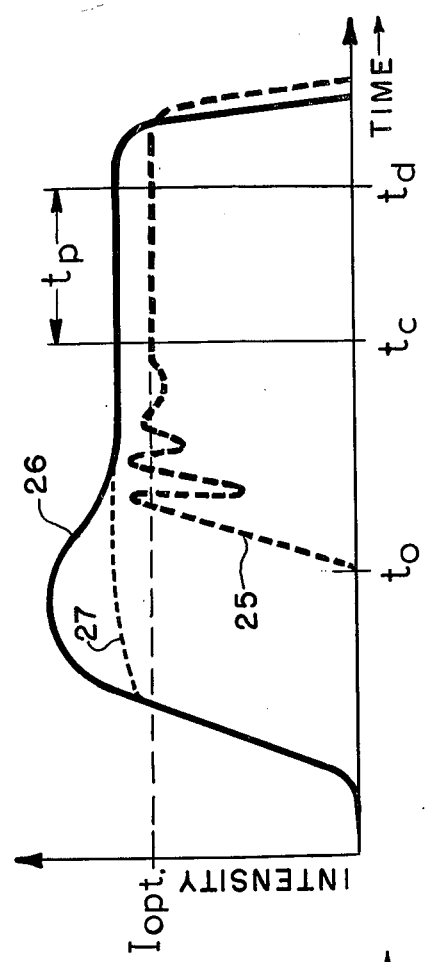
FIG. 7 is a graph of the intensity of laser pulses as a function of time and the various times at which the pulse is permitted to impinge upon the workpiece.

It is necessary to remove a temporal segment of the beam intensity in order to generate pulses suitable to practice the present invention. This can best be seen in FIG. 7 while referring to FIG. 6. Specifically, light switch 17 is rendered opaque to laser radiation for the period $t_c-t_o$, as the intensity of the laser radiation builds. The period of time in which the switch 17 remains opaque to laser radiation is determined by the time delay circuit 13. Specifically, detector 11 senses the intensity of the beam and provides information to the delay 13 by way of line 12 to provide the start of a delay time in delay circuit 13. A signal is provided to the delay circuit 13 as soon as the laser begins to emit its beam ($t_o$). Since the particular time required for the particular laser to reach its steady-state condition is known, namely the period $t_c-t_o$ as in the case of line 25, the delay in delay 13 is precisely set and a signal is provided to control the pulser circuit 15 at the end of that delay, which signal effects an opening of light switch 17 at $t_c$. The laser pulse, having a length $t_p$, is delivered to the workpiece. After $t_d$ delay circuit 13 provides a second signal to the pulser 15 which in turn renders the light switch opaque to laser radiation. Although the graphs as shown in FIG. 7 depict one pulse, such operation may be repetitive and typifies the operation of successively applied pulses to the workpiece 20. FIG. 7 also depicts other intensities generated by various flashlamp currents. Specifically, curves 26 and 27 depict the pumped light intensity paths which are normally generated by well known discharge circuits such as, for example, a xenon lamp inserted in the laser. In all cases, however, delay circuit 13 in combination with the pulser 15 and light switch 17 renders the switch 17 opaque to laser radiation except for the period $t_d-t_c$ or $t_p$. Obviously, different delay times must be selected, which delay times correspond to the time required for the particular laser intensity to reach a steady state condition.

In an effort to use as large an amount of pulse energy as is available from the laser for the ablation of the workpiece, it may be desirable to turn light switch 17 on prior to the start of the laser pulse ($t_o$) or simultaneously therewith (that is, $t_c$ equal to or less than $t_o$). Referring to FIG. 7, the removal of the temporal energy (that is, during the time $t_c-t_o$, and after $t_d$) may not be necessary if the resulting pulse length corresponds to the desired length of ablation and if the declining trailing edge slope of the intensity is sufficiently steep as to provide the required quality at the workpiece surface. The quality can be determined by inspection and experimentation. To assure that no molten material, or substantially no molten material, remains in the hole created by the beam at the end of the laser pulse (which will occur if the vapor pressure is insufficient so as not to eject it), the pulse must be switched off very quickly, that is, within a period of 0.1 microseconds or less.

The selection of the particular mode of laser operation determines the ablation pattern on the workpiece. Thus, single-mode operation, which is characterized by a symmetrically uniform intensity distribution (i.e., Gaussian), creates substantially round holes. If, however, it is desired that the shape of the area to be ablated be more rectangular, a multi-mode laser beam (operating in the $TE_{11}$ mode, for example) could be employed. The $TE_{11}$ mode generally provides four intensity maxima. However, in both cases, to maintain these shapes, rapid pulse turn-off must be effected. Also, it should be pointed out that the optical diode 18 of FIG. 6 should be inserted into the beam path near the workpiece to allow the beam to pass only in one direction. The purpose of the optical diode is to assure that the mode of oscillation developed by the laser is not altered by the beam which is reflected from the workpiece.

If the desired depth of ablation of the workpiece is to be accomplished by applying a rapid succession of pulses of the type taught by this invention, difficulties arise in the development of the rapid sequence of pulses. One solution to this problem includes the selective removal (i.e., switching out) of energy from a long laser pulse so as to create the succession of smaller pulses. However, the level of efficiency is low. In accordance with the techniques of the present invention, another embodiment is presented which does not require costly components for the generation of approximately rectangular light pulses. This embodiment successfully provides the ablation of a workpiece to various depths by a rapidly applied sequence of energy. Specifically, a laser resonator is provided having an effective length which is large enough to sustain pulses, the total length of which corresponds to the sum of all the pulses to be generated in the sequence, which sequence is determined by the desired depth of ablation. The intensity of the beam and the rapid turn-off of the trailing edge of the pulse is selected in accordance with the technique taught by this invention. The rapid sequence of individual pulses applied to the workpiece causes an ablation of incremental depths, each having a particular tolerance which can be controlled. The depth is a function of the total number of individually applied pulses to the workpiece.

By multiplying the number of incrementally ablated deths by the pulse length of an individual pulse, one obtains the period of time required to ablate all the material from a hole having a desired depth. The advantages of this procedure are typified by the fact that the beam may be easily moved from one area of impingement to another in a period of time corresponding to one (or, at most, several) pulse sequence periods and from one particular selected ablation depth to another. Another advantage is that such a system is extremely suitable to control by a digital computer program. Hence, a pattern can be easily reproduced or duplicated. Such a system may include an optical diode to pass the laser light generated by the laser resonator but which is optically opaque to the reflected light, such as previously described.

Another solution to the problem of providing pulses having an intensity and an intensity distribution corresponding to the above-described procedure could include systems for Q-switching. In that case, the laser cavity should be of such a length that the pulses generated therefrom have a length of at least 0.5 microseconds. The pulses generated by the prior art Q-switching systems are considerably shorter than those provided by continuous wave lasers and are not able to attain an effective level of efficiency during the ablation of the workpiece. Thus, if a rapid sequence of pulses is used to cause ablation of the workpiece, it is desirable to provide a sequence of individual pulses having equal pulse lengths at equal intensities and having an intensity corresponding to the teachings of the present invention. Such a system would employ a modulator to control the laser resonance at a frequency corresponding to the desired pulse sequence. Ablation to the desired depth is obtained by providing the required number of individual pulses.

Figure 8:
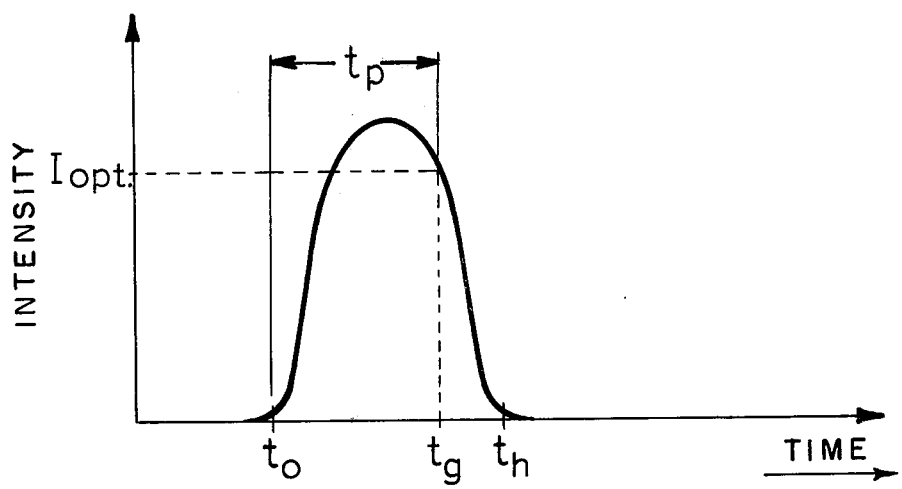
FIG. 8 is a laser pulse used for causing shallow ablations in accordance with the present invention.
Figure 9:
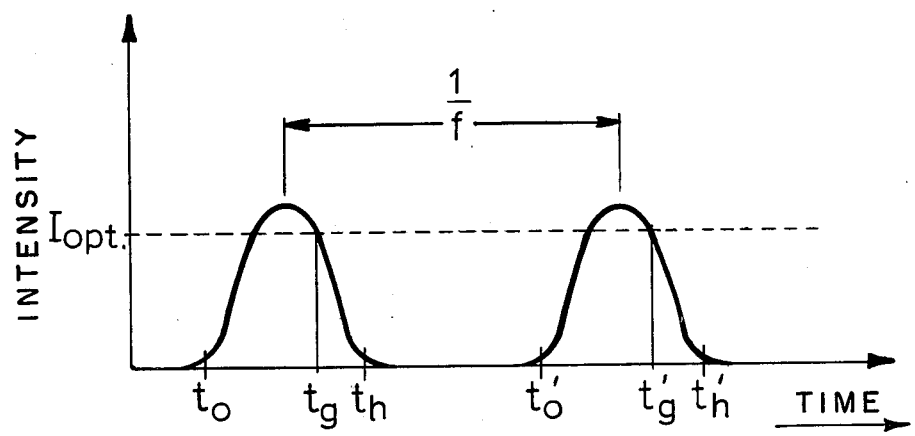
FIG. 9 is a series of pulses successively applied to a workpiece at a selected frequency to cause deep ablation in accordance with the present invention.

When the individual pulses are employed for deep ablation in accordance with the present invention, they should be processed through an optical switch such as switch 17 in FIG. 6 so that the trailing edge of the pulse is removed by the switch at the desired moment (see FIG. 9). This advantageously accelerates the decrease of intensity. Specifically, this action prevents any significant quantity of metal from becoming molten at the end of the pulse, which metal does not have sufficient kinetic energy to become completely ejected. The switch and the pulser required to remove the trailing edge have been previously described. Referring to FIGS. 8 and 9, the intensity I of a laser pulse is shown as a function of time. Optimal intensity is designated as $I_{opt}$. The duration of the pulse, that is, the temporal interval of $t_h-t_o$, is directly proportional to the resonator length. That is the distance between cavity reflectors 2 and 3 of FIG. 6 or FIG. 10. If the physical conditions require, the pulse length can also be obtained by the use of folds created by known deflection techniques. A valid theoretical correlation between the effective length of the resonator and the corresponding pulse length cannot be given since other parameters have an influence. These parameters include the intensification factor of the laser medium and the dissipation on the part of the laser. For the purposes of example, however, consider an Nd-Yag-laser having a commercially available Q-switching device. This system generates pulses having a length of 0.1 microseconds by the use of 100cm resonator length and pulses of approximately 0.5 microseconds by a resonator having a length of 100m. FIG. 8 depicts a single Gaussian pulse used to provide shallow ablations. FIG. 9 represents a typical sequence of pulses generated by the laser wherein only two pulses are shown for lack of space. The pulse sequence, however, consists of a plurality of a large number of pulses provided at a uniform interval (i.e., a fixed frequency) and having the same intensity and duration for deep ablation. In both cases it is desirable to switch out the trailing edge of the pulse for the period $t_h-t_g$. The pulse of laser radiation delivered to the workpiece is therefore $t_p$.

Figure 10:
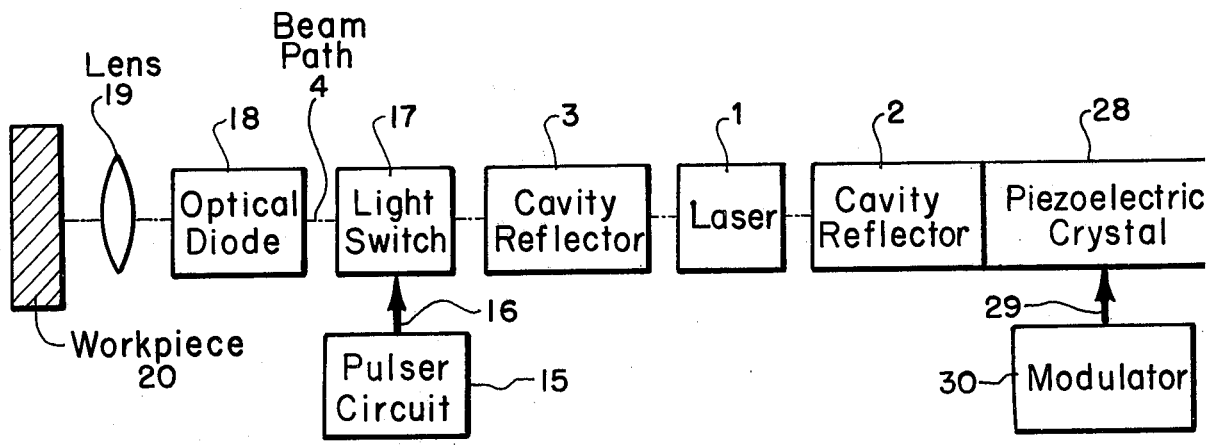
FIG. 10 is a laser system capable of generating the pulses shown in FIGS. 8 and 9.

The pulse shown in FIG. 8 and the pulse sequence shown in FIG. 9 can, for example, be generated with the system shown in FIG. 10. Reference numbers less than the number 20 correspond item for item with the structure employed in FIG. 6. In order to provide the laser pulses of a length $t_h-t_o$ at the frequency $f$ shown in FIG. 9, a modulator 30 is provided which consists of a piezo-electric crystal element 28 mounted on cavity reflector 2. The reflector 2 is modulated by the piezo-electric crystal at the frequency $f$ so that the physical distance between the reflectors 2 and 3 is changed. The frequency of modulation as developed by the modulator 30 is selected in accordance with the desired frequency of the sequentially applied pulses and applied to the piezo-crystal element 28 through line 29. The modulator and the piezo-electric crystal with the reflectors are more fully described in Swiss patent CH No. 2682/74. However, the use of the modulator to practice this invention is thought to be novel. The modulator 30 could also consist of a Kerr or Pockel cell (not shown) connected to a polarizer or filter. Other known elements capable of providing modulated signals can be used, for example, saturation absorbers or acousto-optical modulators (not shown). As in FIG. 6, FIG. 10 shows a light switch 17 which can be controlled by pulser connected by line 16. The switch is controlled in a manner described above by way of connection 16. Light switch 17 is provided in the beam path 4 between the laser 1 and the workpiece 20, and is used to remove a portion of the pulse emerging from the laser resonator, namely $t_h-t_g$. The temporal interval in which the light switch 17 is switched from an opaque condition to a non-opaque condition is shown in FIGS. 8 and 9 as $t_g-t_o$. This results in the sharp decrease of intensity at the end of the pulse and hence the amount of material which remains molten in the ablated area, but not ejected, is minimal. This action is particularly necessary if the trailing edge of a Gaussian-shaped pulse causes the undesired surface condition, such as pieces of metal being sputtered around the area of impingement.

FIG. 11 shows another system capable of practicing the present invention. Elements with reference numbers less than 20 correspond item for item with those shown in FIGS. 6 and 10. In addition to these elements, the system also contains a beam splitter 33 which, when inserted in the primary beam path 4, deflects a small part of the light to a secondary beam path 4'. A sensor/counter 32 is responsive to laser light from the beam splitter 33. This element is connected to comparator 31 which is coupled to a light switch/beam deflector 34. Light switch/beam deflector 34 is inserted in the primary beam path 4 and influences the laser beam and controls its passage. For deep ablation (or when the system provides a sequence of pulses), the number of pulses impinging upon the workpiece at one point can be controlled. Specifically, this control is effected by sensor/counter 32 which senses and counts the number of pulses and provides the information to comparator 31. If light switch/beam deflector 34 is an optical switch, it can be constructed so as to render itself opaque to laser radiation after the occurrence of a preset number of pulses established by comparator 31. Also, if light switch/beam deflector 34 is equipped with beam deflection capabilities, a signal representing the number of pulses received and counted by sensor/counter 32 can be provided, and when the total number of pulses equals the preset value established by comparator 31, a beam deflection command signal is relayed to the light switch/beam deflector 34. Generally, the number of pulses from sensor/counter 32 is compared with the preselected number by comparator 34 and when the numbers correspond, a deflection command signal is generated by comparator 31 to control the deflection of beam 4 by light switch/beam deflector 34. The deflection of the beam through light switch/beam deflector 34 may, for example, include the deflection of the beam path 4 to the next area of the workpiece to be ablated. A deflection of the subsequent pulses to a position in which the laser energy is absorbed is also possible. The command signal from comparator 31 may also be employed to selectively move the workpiece into its appropriate position for successive ablation (not shown).

Another system employed to practice the present invention includes a means of measuring the power of the laser pulses applied to the workpiece by the use of sensor/counter 32. This power is integrated throughout the duration of the pulse (or optionally for deep ablation through a number of successive pulses) to provide an indication of the energy striking the workpiece. This energy value can be preset in comparator 31 to a value which corresponds to the desired ablation depth. When the measured energy corresponds to that preset value, a switching command signal is generated and conveyed to the switching element.

Figure 12A:
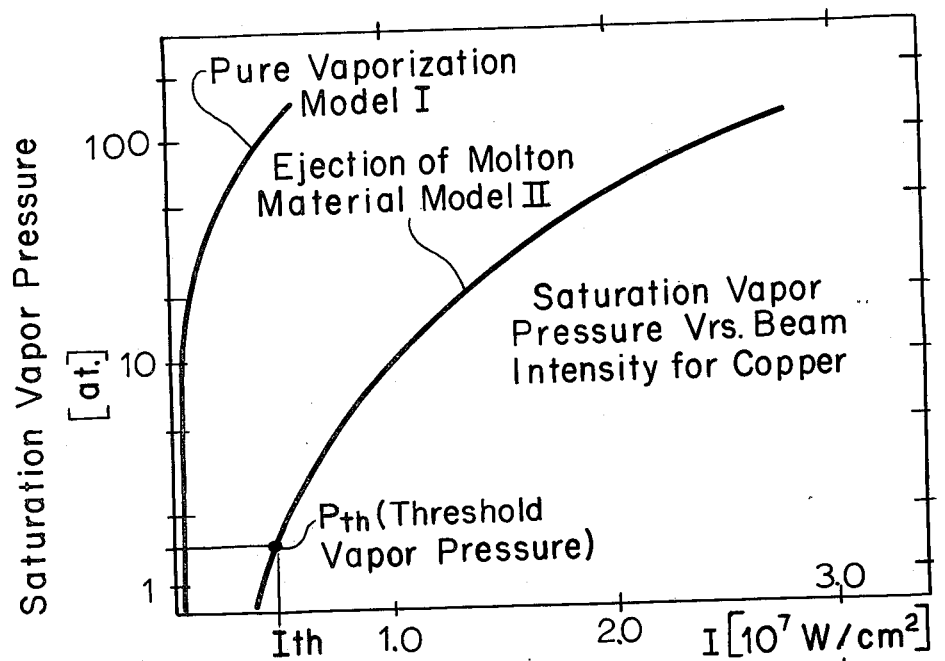
FIG. 12(a) is a graph of saturation vapor pressure versus beam intensity for copper.

Referring to FIG. 12(a), saturation vapor pressure is plotted as a function of beam intensity for copper. It should be readily apparent from the figure that the threshold intensity $I_{th}$ increases as the pressure increases in the area of the workpiece. This is particularly the case in the curve entitled "Model II" which represents the ejection of molten material. The curve entitled "Model I" shows that the ambient pressure in the area of impingement has relatively little effect on the intensity required to provide pure vaporization (at least up to approximately 10 atmospheres).

Figure 12B:
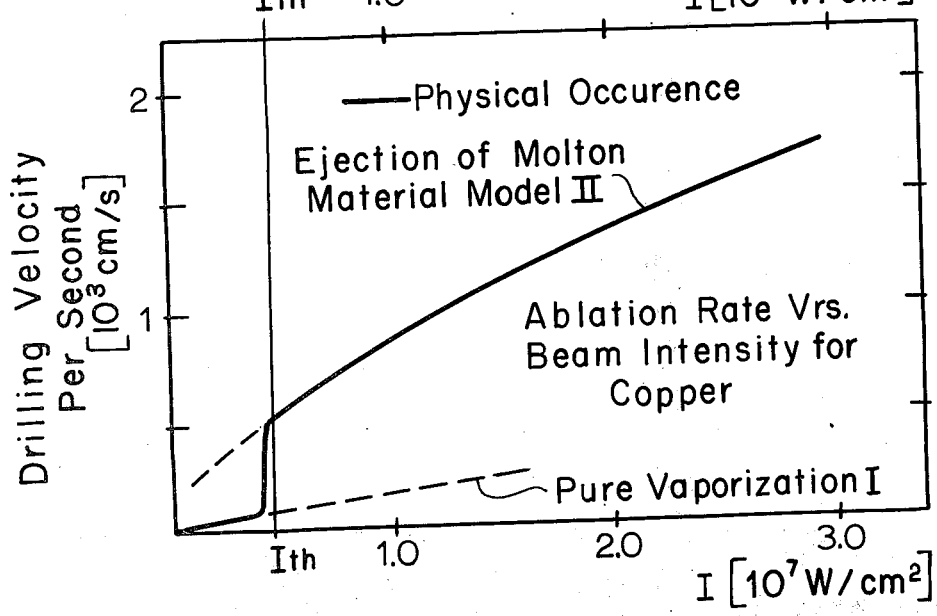
FIG. 12(b) is a graph of drilling velocity versus intensity for copper.

Assuming the workpiece is kept at approximately atmospheric pressure, the threshold vapor pressure, $P_{th}$ as shown, required to cause the ejection of material requires a threshold intensity of $I_{th}$. Thus, referring to FIG. 12(b), a graph of ablation rate versus beam intensity is shown for copper, and the ablation rate substantially increases after the threshold intensity $I_{th}$ has been exceeded. It should be noted from FIG. 12(b) that since the increased rate of ablation occurs when the material is ejected, as compared to when it is ablated by pure vaporization, "Model II" results in a lesser value of surface temperature and vapor pressure.

Figure 13:
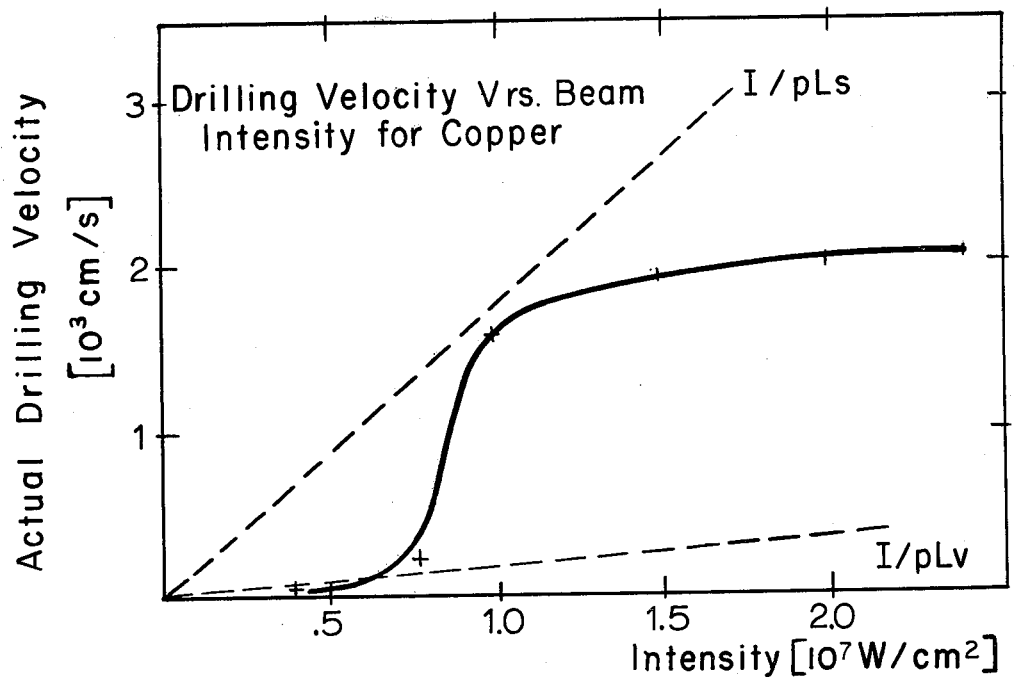
FIG. 13 is a graph of the actual drilling velocity as a function of intensity for copper.

Actual experiments using the results set forth above were conducted regarding the ablation rate and the volume of material ablated for various metals as a function of pulse length and intensity. Various rectangular pulses of graduated pulse length and intensity were applied. The workpiece was kept at atmospheric pressure. Pulse efficiency in the range of $0.1$–$2.5 \times 10^7$ W/cm$^2$ was obtained by the use of calibrated gray filters. The beam was kept in focus at the workpiece. A thin lens having a focal length of 4 centimeters and provided with a protective glass screen (to protect it against the ejection of molten material) was used to focus the beam. The beam diameter of the hole was 80 microns and the depth of the focus was approximately 0.6 millimeters. The pure copper, in the form of a thin sheet having a thickness of 1 millimeter, was placed on a mandrel which could be moved in a direction perpendicular to the beam axis. Five holes were bored for each intensity. The pulse length and output were constantly monitored. Measurement of the hole dimensions was inspected by a microscope. That is, small hole depths were examined from the top with a thousand-fold intensification (depth of focus approximately 1 micron), while cross sections were made for the measurement of deeper holes. FIG. 13 shows values obtained for the boring velocity of copper as a function of intensity from the experiment. The dotted straight lines indicate the ablation rate for pure liquefication ($I/\rho LS$) and for pure vaporization ($I/\rho LV$) under the assumption that the energy at the workpiece was completely absorbed, that is, no reflection of the beam. The absolute calibration of intensity is plus or minus 25%.

Figure 14:
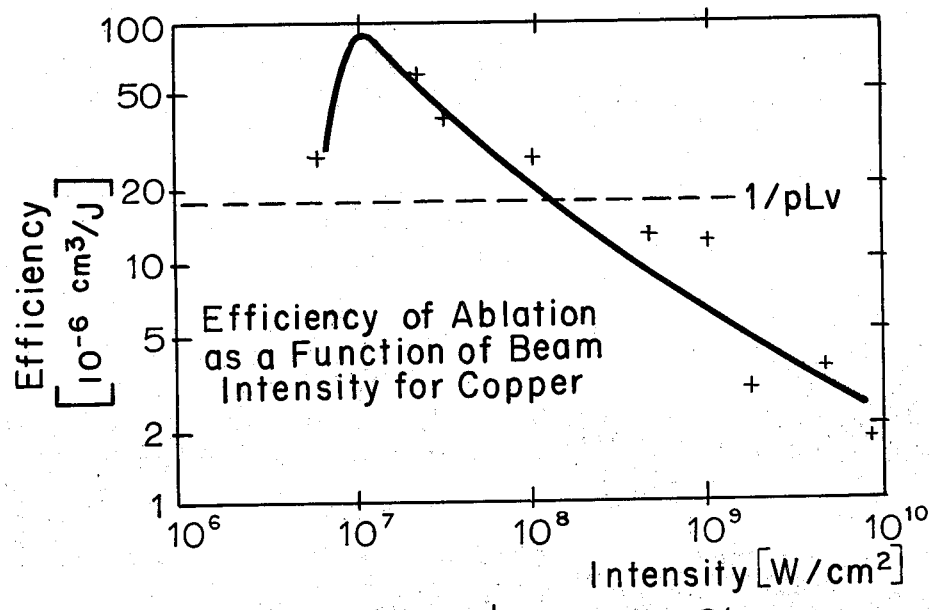
FIG. 14 shows the actual efficiency of boring rate as a function of beam intensity for copper.

To determine the depth of ablation, the displaced volume was calculated as the volume of a truncated cone. The efficiency of the depth of ablation in copper, defined as the hole volume divided by the pulse energy, is shown in FIG. 14.

The beam intensity extends for the range of $10^6$ to $10^{10}$ W/cm$^2$. The dotted horizontal line represents the efficiency of the ablation rate produced by pure vaporization of the workpiece by the beam. It is apparent from the figure that the most efficient ablation rate occurs at an intensity of approximately $10^7$ W/cm$^2$. It is also apparent from the figure that the efficiency of the ablation rate decreases significantly when the curve falls below the efficiency of the ablation rate due to pure vaporization. Because of the fact that the ablation created becomes larger in diameter and more irregular with increasing beam intensity, the conclusion may be drawn that the plume or plasma created gets optically thicker and hotter as intensity increases, which phenomenon results in a defocusing and diffusion of the beam. This condition makes it difficult to interpret the results obtained. Also, if the ablation is not accomplished in a vacuum, air gases in the area of beam impingement break down at approximately $10^9$ W/cm$^2$. This condition is caused by electrons emitted from the workpiece. Finally, beginning at approximately $10^{10}$ W/cm$^2$, noticeable ionization and absorption occur within the plume or plasma itself.

We claim:
1. A method of ablating a metal workpiece comprising:
 establishing a beam of laser radiation having an intensity sufficient to cause vaporization and ejection of molten material created thereby but insufficient to create a plume or a plasma at a point of impingement on the workpiece;
 impinging the beam on the metal workpiece to cause vaporization and ejection of the molten material;

maintaining a constant beam intensity while the beam impinges at the point of impingement on the workpiece; and terminating the intensity of the beam at a rapid rate so that substantially no ejected molten material impinges upon the workpiece.

2. The method as claimed in claim 1 wherein the step of terminating the beam is accomplished in a period of time 0.1 microseconds or less.

3. The method as claimed in claim 1 wherein the intensity of the beam is approximately $10^7$ W/cm$^2$.

4. The method as claimed in claim 1 wherein the intensity of the beam is greater than $0.4 \times 10^7$ W/cm$^2$, but less than $1.2 \times 10^7$ W/cm$^2$.

5. The method as claimed in claim 1 wherein the laser beam is of a Gaussian shape to produce essentially round ablations.

6. The method as claimed in claim 1 wherein the beam is a $TE_{11}$ configuration to provide essentially rectangular ablations.

7. The method as claimed in claim 1 wherein the step of impinging and terminating the beam is accomplished by switching the established beam on and off at selected periods of time.

8. The method as claimed in claim 1 further including the step of successively applying the beam to the workpiece at the point of impingement to provide incremental ablations thereof.

9. The method as claimed in claim 8 wherein the intensity of the beam is approximately $1.0 \times 10^7$ W/cm$^2$.

10. A method of ablating a metal workpiece comprising:

establishing a beam of laser radiation having an intensity sufficient to cause vaporization and ejection of molten material created thereby but insufficient to create a plume or a plasma at a point of impingement on the workpiece;

impinging the beam on the metal workpiece to cause vaporization and ejection of the molten material;

continuously increasing the intensity while the beam impinges upon the workpiece at the point of impingement to provide a deep ablation thereof; and terminating the intensity of the beam at a rapid rate so that substantially no ejected molten material impinges upon the workpiece.

11. The method as claimed in claim 10 wherein the step of terminating the beam is accomplished in the period of time 0.1 microseconds or less.

12. The method as claimed in claim 10 wherein the intensity of the beam is approximately $10^7$ W/cm$^2$.

13. The method as claimed in claim 10 wherein the intensity of the beam is greater than $0.4 \times 10^7$ W/cm$^2$, but less than $1.2 \times 10^7$ W/cm$^2$.

14. The method as claimed in claim 10 wherein the laser beam is of a Gaussian shape to produce essentially round ablations.

15. The method as claimed in claim 10 wherein the beam is a $TEM_{11}$ configuration to provide essentially rectangular ablations.

16. The method as claimed in claim 10 wherein the step of impinging and terminating the beam is accomplished by switching the established beam on and off at selected periods of time.

17. The method as claimed in claim 10 further including the step of successively applying the beam to the workpiece at the point of impingement to provide incremental ablations thereof.

18. The method as claimed in claim 17 wherein the intensity of the beam is approximately $1.0 \times 10^7$ W/cm$^2$.

* * * * *